US005547506A

United States Patent [19]

Rae et al.

[11] Patent Number: 5,547,506
[45] Date of Patent: Aug. 20, 1996

[54] STORABLE LIQUID CEMENTITIOUS SLURRIES FOR CEMENTING OIL AND GAS WELLS

[75] Inventors: Philip Rae, Aberdeen; Neil Johnston, Westhill, both of Scotland

[73] Assignee: BJ Services Company, Tomball, Tex.

[21] Appl. No.: 447,002

[22] Filed: May 22, 1995

Related U.S. Application Data

[62] Division of Ser. No. 186,719, Jan. 25, 1994, Pat. No. 5,447,197.

[51] Int. Cl.$^6$ ................................................ C04B 24/00
[52] U.S. Cl. .................. 106/730; 106/714; 106/719; 106/724; 106/728; 106/726; 106/790; 106/803; 106/805; 106/809; 106/810; 106/DIG. 4; 166/285; 166/292; 166/293
[58] Field of Search ..................... 106/714, 724, 106/729, 730, 789, 790, 802, 804, 805, 809, 810, 718, 720, 803, 823, 285, 292, 293, DIG. 4, 719, 803, 726, 728

[56] References Cited

U.S. PATENT DOCUMENTS

| | | | |
|---|---|---|---|
| 3,955,992 | 5/1976 | Roberts | 106/730 |
| 4,043,827 | 8/1977 | Bernett | 106/730 |
| 4,188,231 | 2/1980 | Valore | 106/823 |
| 4,230,502 | 10/1980 | Lustig et al. | 106/823 |
| 4,676,832 | 1/1987 | Childs et al. | 106/823 |
| 4,964,917 | 10/1990 | Bobrowski et al. | 106/823 |
| 5,004,506 | 4/1991 | Allen et al. | 106/823 |
| 5,108,511 | 4/1992 | Weigland | 106/730 |
| 5,314,022 | 5/1994 | Cowen et al. | 166/293 |
| 5,340,397 | 8/1994 | Brothers | 106/823 |
| 5,379,840 | 1/1995 | Cowen et al. | 106/789 |

*Primary Examiner*—Karl Group
*Assistant Examiner*—Michael Marcheschi
*Attorney, Agent, or Firm*—Arnold, White & Durkee

[57] ABSTRACT

In the method of the invention, a storable hydraulically-active cementitious slurry is made and used to cement within subterranean foundations for oil and gas wells. The slurry is made from hydraulically-active, cementitious material suitable for oil field purposes and can be stored until needed. During storage, the slurry remains liquid. The slurry is activated when needed for cementing. After pumping the activated slurry into the wellbore, the set cement has properties acceptable for well cementing.

17 Claims, No Drawings

5,547,506

STORABLE LIQUID CEMENTITIOUS SLURRIES FOR CEMENTING OIL AND GAS WELLS

This application is a division of application Ser. No. 08/186,719, filed Jan. 25, 1994, U.S. Pat. No. 5,447,197.

BACKGROUND OF THE INVENTION

1. Field of the Invention

The present invention relates to storable cementitious slurries used for oil and gas well cementing, as well as a method of cementing an oil or gas well using the storable slurry.

2. Description of the Prior Art

Hydraulic cements are cements that set and develop compressive strength due to a hydration reaction, not drying. Thus, hydraulic cements can set under water. This setting property serves a variety of purposes. Hydraulic cements are often used for cementing pipes or casings within a well bore of a subterranean formation for the construction of oil, gas and water wells, as well as other purposes, such as squeeze cementing. In the oil and gas industry, successful cementing of well pipe and casing during oil and gas well completion requires cement slurries having several important properties. The cement slurry must have a pumpable viscosity, fluid loss control, minimized settling of particles and the ability to set within a practical time.

In a typical completion operation, the cement slurry is pumped down the inside of the pipe or casing and back up the outside of the pipe or casing through the annular space. This seals the subterranean zones in the formation and supports the casing. The amount of water used in forming the cement slurry depends upon the type of hydraulic cement selected and the job conditions at hand. The amount of water used can vary over a wide range, depending upon such factors as the required consistency of the slurry and upon the strength requirement for a particular job.

Conventional mixing equipment is relatively complex and expensive. The equipment must wet dry cement powder, homogenize the mix, measure its density and, if necessary, recirculate it, such that additional solids or mixwater can be added to achieve the desired density. These varied requirements dictate the equipment's configuration and complexity.

Bulk equipment is usually pressurized so that solids can be transferred pneumatically at the relatively high rates required. Once at the drilling site, the pneumatically conveyed cementing solids must be correctly proportioned and mixed with the water, as well as other additives to form a pumpable slurry. The slurry must then be tested for the appropriate density, with the density adjusted to fall within the appropriate range. If cementing solids are not correctly proportioned, the quality of the cement diminishes.

Because conventional cementing slurries set quickly, they cannot be made in advance of their use. Thus, conventional cementing slurries for cementing well bores cannot be made in advance, such as during the drilling operation. A delay in the drilling operation delays the cementing job. If personnel and equipment for cementing idly wait onsite until the drilling ends, a delay can increase the cost of the cementing job. A slurry made in advance and stored until needed would allow the personnel and equipment to make the storable slurry, regardless of whether drilling had ceased.

One object of the invention is to provide a liquid, storable, cementitious slurry that remains liquid over an extended period of time but can be activated at the time of use to meet specific job requirements.

Another object of the invention is to provide a storable cement slurry that can be made at a different location from the job site. This storable slurry can then be transported to the job site before cementing.

Another object of the invention is to provide a storable cement slurry that can be stored in nonpressurized tanks and easily transferred. In addition, the mixing equipment used on the job site need only homogenize the slurry with any additional water and additives as required en route to the down hole pumps.

Still another object of the invention is to provide an economical method of cementing a well bore that enhances the quality control of the cementing job.

Another object of the invention is to provide a liquid, storable cementitious slurry that can be used by adding liquid activators to the liquid slurry and proportioning any additional mix water and additives to further control the slurry's properties.

Another object of the invention is to provide such a liquid, storable cementitious slurry that can be used in a well cementing operation by simply metering and controlling liquids rather than by mixing dry bulk products with liquids.

Another object of the invention is to continuously formulate a liquid, storable cementitious slurry on one site, transfer the slurry to the site of application where it is activated and its density adjusted, then pumped into the subterranean formation for cementing.

Another object of the invention is to enhance wellsite efficiency by reducing the time required for the cementing operation. Current practices face rate limitations due to the inherent problems of bulk supply, particle wetting and dispersion, etc. Use of a pre-mixed, storable slurry removes these restrictions, permitting the operation to be carried out consistently at high rates.

SUMMARY OF THE INVENTION

The storable, hydraulically-active, cementitious slurry of the invention is suitable for cementing within subterranean formations for oil or gas wells. The storable slurry comprises a hydraulically-active cementitious material of a type suitable for cementing within subterranean formations for oil or gas wells; an effective amount of a set retarder to allow the storage of the slurry with a minimal change of the slurry's set characteristics after activation and to allow the reversal of the retardation after adding an effective amount of an activator to the slurry prior to cementing; a suspending agent for maintaining the slurry with minimal separation of the cementitious material, an effective amount of water to form a pumpable slurry and optionally, a dispersant to maintain the fluidity of the mix.

In one method of the invention, a subterranean formation for an oil or gas well is cemented with the storable, hydraulically-active, cementitious slurry formulated by mixing together a hydraulically-active cementitious material, a set retarder, a suspending agent, water, and optionally a dispersant, wherein the storable slurry's characteristics minimally change during storage. The storable slurry is stored until required for cementing, at which time it is activated by mixing together an activator and the storable slurry, pumped into the subterranean formation and allowed to set.

In another method of the invention, the density of the slurry is measured and adjusted to the desired density for a particular cementing application by metering and controlling liquids rather than by mixing dry bulk products and liquids.

In still another method of the invention the steps of the method are performed at two different locations. In this method, the stable, hydraulically-active, cementitious slurry is formulated at one location, transferred to a second location, activated at the second location, then pumped into the subterranean formation for cementing.

Additional effects, features and advantages will be apparent in the written description that follows.

DETAILED DESCRIPTION OF THE INVENTION

A storable, hydraulically-active, cementitious slurry of the invention is made from a hydraulically-active cementitious material. Hydraulically-active cementitious materials include materials with hydraulic properties, such as hydraulic cement, slag and blends of hydraulic cement and slag (slagment) which are well known in the art. The term "hydraulic cement" refers to any inorganic cement that hardens or sets due to hydration. In this disclosure, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, the like. Strength enhancers such as silica powder or silica flour can be employed as well. Hydraulic cements, for instance, include portland cements, aluminous cements, pozzolan cements, fly ash cements, and the like. Thus, for example, any of the oilwell type cements of the class "A-H" and "J" as listed in the API Spec 10, (1st ed., 1982), are suitable hydraulic cements.

The type of slag used for the invention has hydraulic properties. The slag is preferably ground-granulated blast furnace slag with a minimum glass count of about 95% and a fine particle size of about 1 to about 100 μm, preferably less than about 45 μm, most preferably less than 10 μm or a fineness of about 310 to about 540 m$^2$/kg. See, e.g., U.S. Pat. Nos. 5,125,455 and 5,106,423. A slag slurry develops little strength without increasing the alkalinity of the slurry to initiate hydration. Slag alone can also produce a brittle set product and fluid loss from the slag slurry can be difficult to control.

Slagments are preferably blends of slag and portland cement. Examples of suitable slagments include blends ranging from about 90% cement with 10% slag to 10% cement with 90% slag, with a particularly preferred blend of 60% slag with 40% cement with all percentages based on the dry weight of each component.

Slagment and hydraulic cement are preferred cementitious materials. However, both of these materials react quickly with water and set at room temperature unless modified, and they are, therefore, much more difficult to control. The interstitial water of both cement and slagment slurries is also very aggressive, for example, having a high pH. Yet, storable slurries formed from hydraulic cement, especially portland cement, or slagment have the best overall performance characteristics for well cementing applications.

A set retarder is necessary to prevent the setting of the slurry during storage. The characteristics of these set retarders are diverse and important. An effective amount of set retarder allows the storage of the slurries with minimal changes in the characteristics of both the stored and activated slurry. It is equally important that this effect is reversible after adding an effective amount or low concentration of activator to the slurry, even at low well circulating temperatures. In addition, the set retarder should preferably provide some dispersion of the slurry without overdispersion, and little effect on the compressive strength after activation and setting.

Suitable set retarders include glucoheptonates, such as sodium glucoheptonate, calcium glucoheptonate and magnesium glucoheptonate; lignin sulfonates, such as sodium lignosulfonate and calcium sodium lignosulfonate; gluconates, such as sodium gluconate, calcium gluconate and calcium sodium gluconate; phosphonates, such as the sodium salt of EDTA phosphonic acid; sugars, such as sucrose; hydroxycarboxylic acids, such as citric acid; and the like, as well as their blends. Calcium gluconate for hydraulic cement and slagment slurries and sodium glucoheptonate for slag slurries are especially preferred.

The amount of set retarder can vary, depending on the type of cementitious material, the type of set retarder selected and the desired storage time. Since this disclosure refers to both slags and hydraulic cements, the term "BWOC" refers to by weight of the cementitious material. For slagments and hydraulic cements, typical amounts of gluconates and glucoheptonates range from about 0.1% to about 5% BWOC, preferably from about 0.2% to about 1% BWOC, with about 0.5% BWOC of calcium gluconate especially preferred. For slags, typical amounts of gluconates and glucoheptonates range from 0% to about 3% BWOC, with about 0.1% to about 0.4% BWOC of sodium glucoheptonate especially preferred.

Because the cementitious material may separate during storage due to reduced interparticle interactions when compared with normal cement slurries, adding a suspending agent maintains the slurry with minimal separation of the cementitious material. Certain types of suspending agents of the type used in the drilling mud industry can be used for the purposes of the present invention. These suspending agents include polymers, clays, emulsions, transition metal oxides and hydroxides, and the like. Because more than one suspending agent can be used in the storable slurry, in this disclosure, the term "suspending agent" refers to one or more suspending agents. While some particle separation can still occur over time, routine agitation redisperses the separated particles and rehomogenizes the slurry during storage.

However, the long term suspension of storable cementitious slurries can be somewhat problematic. Both hydraulic cement and slagment slurries pose more difficulties due to the aggressive nature of the interstitial water. This aggressive nature of the interstitial water hydrolyzes some polymers, initiates gelation or crosslinking of other polymers and impairs the long-term support properties of clays by ion-exchange, for example. Suitable suspending agents for hydraulic cements and slagments, therefore, should not gel, crosslink or hydrolyze polymers, nor impair the long-term support of clays. Specific examples of suspending agents useful for the purposes of the present invention include polysaccharides, such as welan gums "BIOZAN", Kelco, San Diego, Calif.), xanthan gums, cellulose and its derivatives like carboxymethyl cellulose, polyanionic cellulose "DRISPAC", Drilling Specialties, Bartlesville, Okla.), carboxymethylhydroxyethyl cellulose, guar and its derivatives, starch, succinoglycan "SHELLFLO-S", Shell International Chemical Co., Ltd., London, England); polyethylene oxide "POLYOX PEO", Union Carbide, Danbury, Conn.); clays such as bentonite and attapulgite; mixed metal hydroxides "POLYVIS", SKW, Trostberg, Germany); as well as their combinations, and oil-in-water emulsions created with paraffin oils and stabilized with ethoxylated surfactants. "SHELLFLO-S.", polyethylene oxide and bentonite are especially preferred for portland cements and slagments. Slag slurries are preferably suspended using xanthan gums with or without bentonite clay.

The amount of suspending agent used in the storable slurry depends on the type of hydraulically-active cementitious material and selected suspending agent. For slag, the amount of xanthan gum preferably ranges from 0 to about 2 ppb with the bentonite ranging from 0 to about 8 ppb, with about 0.66 of xanthan gum and 0 to about 3 ppb of bentonite especially preferred. For hydraulic cement and slagment, the amount of "SHELLFLO-S." preferably ranges from 0 to about 0.4 gpb based on the amount of the mixwater, with about 0.1 gpb to about 0.2 gpb preferred, and bentonite ranges from 0 to about 10 ppb, with 0 to about 3 ppb preferred. If polyethylene oxide is used alone, the amount preferably ranges from 0 to about 5 ppb with about 0.5 ppb to about 2 ppb especially preferred. Polyethylene oxide may be combined with any of the other suspending agents.

An optional dispersing agent may be used in the storable slurry to control the fluidity of the slurry. The amount of dispersing agent depends of the type of hydraulically-active cementitious material used, selected suspending agent and desired density of the storable slurry. Specific examples of dispersing agents include melamine sulfonic acid polymer condensation product "SP5", "CORMIX", Warrington, England), sodium polyacrylate "BEVALOID 6770", Rhône-Poulenc, Watford, England), naphthalene sulfonic acid polymer "LOMARD", Diamond Shamrock Chemicals Co., Morristown, N.J.), and sulfonated-styrene maleic anhydride polymer "SSMA", (Miltemp, Milpark, Houston, Tex.). The preferred dispersing agent is SSMA and the amount preferably ranges from 0 to about 5 pounds per barrel of mix water, with about 1 to about 3 pounds per barrel especially preferred.

Mixing water containing the above-mentioned additives with the dry hydraulically-active cementitious materials produces the storable slurry. A sufficient amount of water, preferably fresh water, should be added to the hydraulically-active cementitious material to form a liquid storable slurry of suitable consistency. A storable slurry with portland cement should have a density measuring in the range from about 11 to 17.5 lbm/gal and preferably in the range of about 14 to 17.5 lbm/gal, more preferably about 15–16.5 lbm/gal. Storable portland cement slurries at densities about 17.5 lbm/gal and greater have a tendency to gel or undergo a type of "pack-setting" when stored for prolonged periods. Slurry densities for slag slurries of about 15 lbm/gal are preferable.

Depending upon the particular storable slurry, the amount of mixing water in the slurry of the present invention ranges from about 30 to 150 weight percent based upon the dry weight of cement and preferably is in the range of about 35 to 90 weight percent.

Under normal conditions, the storable slurries of the invention have considerable longevity. The storable slurry of the invention should remain stable as a liquid, preferably for about a week and more preferably about two to three months without setting. In some cases, storage times in excess of six months will be achieved. Changes in thickening time of the activated hydraulic cement slurries, even after prolonged storage of the nonactivated slurry, are not excessive and such changes are readily determined using techniques known in the art.

At the time of cementing, the stored slurry is activated, pumped into the well and allowed to set. Activation occurs by adding an activator. The activator initiates hydration and allows the slurry to set after a predetermined pumping time.

The activator must counteract the set retarder while having a minimal effect on final slurry properties or set characteristics, such as rheology and fluid loss when used in an effective amount. In addition, the activator should be easy to pump and handle, such as a liquid; economical; widely available at reasonable purity; safe to ship and handle and environmentally acceptable.

Activators for a storable slurry include solutions of Group IA and IIA hydroxides, such as sodium hydroxide, magnesium hydroxide and calcium hydroxide; sulfates, such as sodium sulfate; aluminates, such as sodium aluminate and potassium aluminate; carbonates, such as sodium carbonate and silicates. Preferred activators are sodium silicates. Sodium silicate has a large number of industrial uses which include drilling fluids and waterproofing mortars and cements. For slag slurries a sodium silicate "Crystal 120H", Crosfield, Warrington, England)) with a particular silica/soda ratio is especially preferred. Sodium silicate ("Crystal 100S", Crosfield) with a different silica/soda ratio is especially preferred for hydraulic cement and slagment slurries. Typical concentrations of activator range from about 0 to about 8 gpb of slurry, preferably about 1 to about 3 gpb of slurry and are preferably added with additional mixwater.

There are two approaches for controlling the thickening time of the activated storable slurries. The first approach is to accurately meter or measure out the activator based on a dose-response curve so the stored slurry becomes "less retarded" and provides the desired thickening time. Because the slope of the dose-response curve may be steep, the slurries may be too sensitive to permit the accurate control of thickening at the wellsite.

The second approach is to "over-activate" the slurry and add additional or secondary set retarders, such as lignin sulfonates, tartrates, gluconates, glucoheptonates, and the like, to achieve the desired thickening time. The "over-activated" slurries respond normally to conventional levels of retarder and exhibit far less sensitivity. In addition, "over-activation" might boost the early compressive strength of the set slurries. A typical concentration of additional set retarder sodium lignosulfonate "R12-I", 40% active, Boregard, Sarpsborg, Norway) ranges from 0 to about 1 gpb.

Extra water is preferably added to the storable slurry during activation. This extra water may be fresh water, sea water or brine. The extra water may contain activator and additional additives, for instance, potassium chloride, dispersants, viscosifiers, secondary retarders, liquid supensions of weighting agents and chemical extending agents.

The activated slurry can be adjusted to the desired density for a particular cementing application. The slurry density can be increased by the addition of a liquid suspension of a weighting agent, such as trimanganese tetraoxide. Lower density slurries can be prepared by adding more water and modifying activator concentrations, if required. Thus, storable slurry "concentrates" can be made in advance and diluted when activated. For example, a 12.5 lbm/gal portland cement slurry can be prepared by adding 2–3 gallons sodium silicate activator per bbl of slurry and around 38 gallons of additional water per bbl to a storable slurry having the initial density around 15.8 to 16.5 lbm/gal.

Preferably, a pumpable slurry is formed with a measured density ranging from about 11 to about 20 lbm/gal, more preferably in the range of about 14 to about 16 lbm/gal and most preferably about 15 lbm/gal. Although the latter is a lower density than conventional "neat cement", the mechanical properties of the set cement are appropriate for well cementing applications. Furthermore, the volume yield increases and the rheology improves by this slight density reduction.

Once set, the storable slurries of the invention have normal levels of compressive strength.

In the preferred method of the invention, a storable cementitious slurry is made using an oilwell type portland cement, for example, "Dyckerhoff Class G" (Dyckerhoff Zementwerke, Wiesbaden, Germany). The cement is mixed together with a calcium gluconate (0.5–0.75% BWOC) set retarder, 3 ppb of bentonite and about 0.1 gpb "SHELLFLO-S" suspending agent (or alternatively with 2 ppb "POLYOX PEO" alone) and sufficient water to reach a density of about 15.8 to 16.5 lbm/gal. Dispersants, such as polyacrylate, sulfonated styrene maleic anhydride, naphthalene sulfonic acid polymer, and the like, are well known in the art and can be added to the above mixture as needed. The resultant slurry can be kept with occasional agitation for periods of time exceeding twelve weeks under normal storage conditions.

The storable slurry is activated by adding the necessary amount of activator, in this case sodium silicate (100S) is preferably added in an amount of 1 to 3 gpb of slurry before pumping into the well bore. The activator is preferably added with a small volume of additional water to adjust the final density of the activated slurry to 15 lbm/gal.

Table 4 shows rheological properties for three storable slurries and demonstrates that the rheological properties are changed minimally when kept for prolonged periods. The slurries have some viscosification upon activation. If such viscosification is undesirable, it can be substantially eliminated by adding dispersants to the slurry. Table 5 shows the rheological properties for three activated slurries and demonstrates that the rheological properties are minimally changed.

Fluid loss control is essential for many conventional cementing applications, for example, squeeze cementing and the cementing of liners and production strings. The addition of conventional cementing fluid-loss additives, such as polyvinyl alcohol, styrene-butadiene latex, co- and ter-polymers of acrylamidomethylpropanesulfonic acid, hydroxyethyl cellulose, carboxymethyl hydroxyethyl cellulose, carboxymethyl cellulose and starch, to storable hydraulic cement and slagment slurries, at the time of activation, provides acceptable levels of control.

A number of additional factors may affect the performance of the storable slurries of the invention. Conventional cement slurries, under certain circumstances, are sensitive to shear and exhibit changes in rheology and thickening time, for example, that depend on the mixing energy or pipe shear to which they are exposed. The storable slurries of the invention do not exhibit undue shear sensitivity and, therefore, should be mixable with a variety of field equipment.

The storable slurry of the invention offers the option of adding material either to the slurry itself or to extra mixwater used to dilute the slurry to the final design density. It is well known that the response of cements to certain additives, for example, dispersants, retarders and gelling agents depends on how the additives are introduced to the slurry. Dry blended additives often elicit qualitatively different performance characteristics than those added to mixwater. Even greater differences are sometimes seen if additives are added to an already-mixed slurry. The order of addition of activator and additional additives to the slurry has little effect on the rheology of the activated slurry when mixed at normal API shear rates.

The following example is provided to increase the understanding of the invention, without limiting the scope of the invention.

EXAMPLE 1

All of the experiments using slag were run with slag having a fineness of 420 $m^2$/kg. All experiments with portland cement used "Dyckerhoff Class G" or "Cemoil Class G" cement. Slagments were 70/30 blends ordinary portland cement (Castle Cement, Coatbridge, Strathclyde, Scotland) and 420 $m^2$/kg fineness slag.

The experimental protocols followed standard laboratory testing procedures outlined in the API Specification 10. Where necessary, these procedures were modified, such as when the order of addition and mixing energy variables were being studied.

Mixwater was placed in a plastic beaker and stirred with a paddle mixer while adding the suspending agent until the suspending agent was dispersed or hydrated. Next, the set retarder was added while stirring until dissolved. Finally the optional dispersant was added while stirring until dissolved.

The mixwater prepared above was transferred to a Waring blender fitted with an electronic speed control with the speed adjusted until forming a good vortex. While maintaining the vortex by controlling the blender speed, the hydraulically-active cementitious material was added and the time of addition recorded. After 60 s of stirring the slurry, the blender was stopped.

The slurry was transferred to a Fann 35 viscometer cup while noting the slurry's physical characteristics. The initial slurry rheology was measured, and optionally at 10 s and 10 min., using standard rotor 1, spring 1 and bob 1 viscometer configuration at room temperature.

Next, the slurry was transferred to a wide-mouthed plastic bottle fitted with a screw top lid and tightly sealed. The bottle was stored for extended periods of time.

At regular intervals during storage, the slurry's condition was checked. Using a small spatula, free water, gel strengths, the separation of cementitious material particulates, gelation, setting and the general appearance of the slurry were noted. Then, the slurry was remixed thoroughly by stirring and shaking. When desired, the rheology was checked as described above. The storage and testing continued until the slurry set hard. The hard set was usually preceded by a period of high slurry viscosity and gelation, rendering the material unusable before it actually set.

The activation and testing of the final slurry was done with either freshly prepared slurry or stored slurry. A similar mixing energy as described in API Spec 10, §5 for conventional cements was used. The slurry was placed in an electronically controlled Waring blender and stirred at 4,000 rpm for 60 s. The activator plus dilution water and any additional additives were then introduced at 4,000 rpm within a 15 s interval. The mixture was next blended at 12,000 rpm for 35 s.

After final activation and blending, the slurry was tested like a conventional cement slurry. Conventional antifoams could be used to reduce air entrainment as required.

TABLE 1

STORABLE SLURRY STABILITY TESTING

| No. | SLURRY DENSITY | CEMENT TYPE | SUSPENDING AND DISPERSING AGENTS[1] | RETARDER % BWOC | TIME WEEKS | COMMENTS |
|---|---|---|---|---|---|---|
| 1 | 15 | Slag | 0.33 ppb welan gum[2] | 0.1 NaGH[3] | 1 | stable |
| 2 | 15 | Slag | 0.9 ppb xanthan[4] | 0.1 NaGH | 4 | stable |
|  |  |  |  |  | 7 | acceptable/settling |
| 3 | 15 | Slag | 0.66 ppb xanthan | 0.1 NaGH | 7 | stable |
|  |  |  |  |  | 14 | acceptable/settling |
| 4 | 16 | Slag | 0.9 ppb xanthan | 0.1 NaGH | 2 | mod. gel |
| 5 | 15 | Slagment | 0.9 ppb xanthan | 0.5 NaGH | 1 | sedimented |
| 6 | 15 | Slagment | 0.2 gpb SS[5] | 0.5 NaGH | 1 | stable, fluid |
|  |  |  |  |  | 7 | stable |
| 7 | 15.8 | Portland | 0.7 ppb xanthan | 0.5 NaGH | 1 | stable |
|  |  |  |  |  | 2 | settling |
| 8 | 15.8 | Portland | 0.9 ppb xanthan + 1 gpb NSAP[6] | 0.5 NaGH | 1 | settling |
| 9 | 15.8 | Portland | 0.7 ppb welan gum | 0.5 NaGH | 1 | stable/gel |
|  |  |  |  |  | 3 | gel/thick |
| 10 | 15.8 | Portland | 0.5 ppb welan gum | 0.5 NaGH | 2 | settling |
| 11 | 15.8 | Portland | 0.3 ppb welan gum | 0.5 NaGH | 1 | settling |
| 12 | 15.8 | Portland | 1 ppb CMC[7] + 0.8 gpb NSAP | 0.5 NaGH | 1 | bad gel |
| 13 | 15.8 | Portland | 0.4 ppb CMC + 0.1 gpb PA[8] | 0.5 NaGH | 7 | stable |
|  |  |  |  |  | 9 | set |
| 14 | 15.8 | Portland | 1 ppb PAC[9] | 0.5 NaGH | 1 | bad gel |
| 15 | 15.8 | Portland | 1 ppb CMHEC[10] | 0.5 NaGH | 1 | thixotropic gel |
| 16 | 15.8 | Portland | 1 ppb Starch | 0.5 NaGH | 1 | bad gel |
| 17 | 15.8 | Portland | 5 ppb Attapulgite | 0.5 NaGH | 1 | settling |
| 18 | 15.8 | Portland | 5 ppb Attpulgite + 0.4 ppb xanthan | 0.5 NaGH | 1 | bad gel |
| 19 | 15.8 | Portland | 5 ppb BC[11] | 0.5 NaGH | 1 | thick |
| 20 | 15.8 | Portland | 3 ppb BC | 0.5 NaGH | 4 | stable |
|  |  |  |  |  | 5 | some settling |
| 21 | 15.8 | Portland | 3 ppb BC + 0.03 gpb ppb AlCH[12] | 0.5 NaGH | 1 | stable |
|  |  |  |  |  | 2 | bad gel |
| 22 | 15.8 | Portland | 2 ppb BC + 8.3 ppb microsilica[13] | 0.5 NaGH | 1 | stable |
|  |  |  |  |  | 2 | bad gel |
| 23 | 17 | Portland | 5 ppb BC + 0.8 gpb NSAP | 0.5 NaGH | 1 | sediment |
| 24 | 15.8 | Portland | 5 ppb BC + 0.2 xanthan | 0.5 NaGH | 2 | stable |
|  |  |  |  |  | 4 | mod gel |
|  |  |  |  |  | 5 | set |
| 25 | 16.5 | Portland | 3 ppb BC + 0.2 xanthan | 0.5 NaGH | 3 | stable |
|  |  |  |  |  | 4 | thick |
|  |  |  |  |  | 5 | set |
| 26 | 16.5 | Portland | 0.2 ppb welan gum | 0.5 NaGH | 1 | bad gel |
| 27 | 16.5 | Portland | 0.1% PVP[14] | 0.5 NaGH | 1 | gel/sediment |
| 28 | 15.8 | Portland | oil emulsion[15] | 0.5 NaGH | 1 | compact |
| 29 | 16.5 | Portland | 0.2 gpb SS | 0.5 NaGH | 1 | settling |
|  |  |  |  |  | 3 | compact |
| 30 | 16.5 | Portland | 20 ppt XL-guar[16] | 0.5 NaGH | 1 | gelled |
| 31 | 16.5 | Portland | 5% BWOC $Fe_2O_3$, orange[17] | 0.5 NaGH | 1 | stable |
|  |  |  |  |  | 3 | thick/compact |

TABLE 1-continued

STORABLE SLURRY STABILITY TESTING

| No. | SLURRY DENSITY | CEMENT TYPE | SUSPENDING AND DISPERSING AGENTS[1] | RETARDER % BWOC | TIME WEEKS | COMMENTS |
|---|---|---|---|---|---|---|
| 32 | 16.5 | Portland | 3% BWOC Magneplus[18] | 0.5 NaGH | 1 | gelled |
| 33 | 16.5 | Portland | 0.2 ppb welan gum | 0.5 CaG[19] | 2 | stable |
|    |      |          |                   |          | 3 | compacted |
| 34 | 15.8 | Portland | 4 ppb BC | 0.4 CaG | 3 | stable |
|    |      |          |          |         | 4 | stable > T. Time test |
| 35 | 15.8 | Portland | 0.27 gpb SS + 0.27 gpb PA | 0.5 CaG | 1 | slightly gelled |
|    |      |          |          |         | 7 | slightly sedimented |
| 36 | 15.8 | Portland | 0.7 ppb xanthan + 0.32 gpb PA | 0.5 CaG | 4 | settled |
| 37 | 16.5 | Portland | 0.2 gpb SS + 0.4 PA | 0.5 CaG | 5 | stable |
|    |      |          |          |         | 6 | gel |
|    |      |          |          |         | 7 | thick |
| 38 | 15.8 | Portland | 3 ppb BC + 0.1 gpb SS + 0.3 gpb PA | 0.5 CaG | 3 | stable |
|    |      |          |          |         | 4 | bad gel |
| 39 | 15.8 | Portland | 3 ppb BC | 0.5 CaG | 7 | stable |
| 40 | 15.8 | Portland | 2 ppb PEO[20] | 0.5 CaG | 7 | stable |
| 41 | 16.5 | Portland | 1.6 ppb PEO 0.5 ppb SSMA[21] | 0.5 CaG | 6 | stable |
| 42 | 15.8 | Portland | 1.5 ppb PEO 1.5 ppb SSMA | 0.5 CaG | 8 | stable |

[1]All concentrations of suspending and dispersing agents are based on the quantity of mix water.
[2]Welan gum biopolymer, "BIOZAN"
[3]Sodium glucoheptonate
[4]Xanthan gum
[5]Succinoglycan, "SHELLFLO-S"
[6]Naphthalene sulfonic acid polymer
[7]Carboxymethyl cellulose
[8]Soidum polyacrylate
[9]Polyanionic cellulose, "DRISPAC"
[10]Carboxymethylhydroxyethyl cellulose
[11]Bentonite clay
[12]Aluminum chlorohydroxide
[13]Microsilica, Elkem Chemical, Kristiansand, Norway
[14]Polyvinylpyrrolidone
[15]5% bvol Lotox oil/95% bvol fresh water stabilized with sulfonated nonyl phenol ethoxylate surfactant
[16]Crosslinked guar
[17]Ferric oxide, fine (±0.5 micron) pigment grade, Bayer AG, Germany
[18]Magnesia cement
[19]Calcium gluconate
[20]Polyethylene oxide, "POLYOX"
[21]Sulfonated styrene maleic anhydride

TABLE 2

STORABLE SLURRY SET RETARDATION

| SLURRY DENSITY | RETARDER | CONC. % BWOC | SUSPENDING AGENT | STORAGE TIME (DAYS) CEMENT TYPE[1] | | |
|---|---|---|---|---|---|---|
| | | | | SLAG | SLAG-MENT | PORT-LAND |
| 15 | NaGH[2] | 0 | 0.66 ppb xanthan[3] | 8 | | |
| 15 | NaGH | 0.1 | 0.66 ppb xanthan | 103< | | |
| 15 | NaGH | 0.2 | 0.66 ppb xanthan | 103< | | |
| 15 | NaGH | 0.4 | 0.66 ppb xanthan | 103< | | |
| 15 | NaGH | 0.3 | 2 ppb BC[4] | | 13 | |

TABLE 2-continued

STORABLE SLURRY SET RETARDATION

| SLURRY DENSITY | RETARDER | CONC. % BWOC | SUSPENDING AGENT | STORAGE TIME (DAYS) CEMENT TYPE[1] | | |
|---|---|---|---|---|---|---|
| | | | | SLAG | SLAG-MENT | PORTLAND |
| 15 | CaG[5] | 0.5 | 0.12 gpb SS[6] | | 54< | |
| 15.8 | NaGH | 0.2 | 0.45% BWOC xanthan | | | 9 |
| 15.8 | NaGH | 0.3 | 0.45% BWOC xanthan | | | 24 |
| 15.8 | NaGH | 0.5 | 0.45% BWOC xanthan | | | 39 |
| 16.5 | NaGH | 0.7 | 0.45% BWOC xanthan | | | 38 |
| 16.5 | NaG[7] | 0.5 | 3 ppb BC | | | 58< |
| 16.5 | CaG | 0.2 | 3 ppb BC | | | 17 |
| 16.5 | CaG | 0.4 | 3 ppb BC | | | 38< |
| 16.5 | CaG | 0.5 | 3 ppb BC | | | 61< |
| 15.8 | CaG | 0.7 | 3 ppb BC | | | 54< |
| 16.5 | Citric acid | 0.5 | 3 ppb BC | | | 22 |
| 16.5 | CSLS[8] | 0.5 | 3 ppb BC | | | 8 |
| 16.5 | Sucrose | 0.5 | 3 ppb BC | | | Gel |
| 15.8 | CaG | 0.5 | 1.5 ppb PEO[9] | | | 60< |
| 15.8 | CaG | 0.5 | 1.5 pb PEO 1.5 ppb SSMA[10] | | | 60< |

[1]Time in days indicates when the stored slurry hardened. In some cases the slurry would be unsuitable for use prior to this time.
[2]Sodium glucoheptonate
[3]Xanthan gum
[4]Bentonite clay
[5]Calcium gluconate
[6]"SHELLFLO-S"
[7]Sodium gluconate
[8]Calcium sodium lignosulfonate
[9]Polyethylene oxide
[10]Sulfonated styrene maleic anhydride

TABLE 3

ACTIVATION OF STORABLE SLURRIES

| SLURRY DENSITY | RETARDER | CEMENT TYPE | ACTIVATOR TYPE | CONC | COMMENTS 21° C. (70° F.) |
|---|---|---|---|---|---|
| 15 | 0.1% NaGH[1] | Slag[2] | Na sulfate | 10 ppb | Ineffective |
| 15 | 0.1% NaGH | Slag | Soda ash | 10 ppb | 49 hrs set |
| 15 | 0.1% NaGH | Slag | Sodium silicate 100S | 2 gpb | 14 hrs set, suitable activator |
| 15 | 0.1% NaGH | Slag | 30% NaOH | 0.5 gpb | 48 hrs, no set |
| 15 | 0.5% CaGH[3] | Slag-ment[4] | Sodium silicate 100S | 3 gpb | 14 hrs set, suitable activator |
| 15.8 | 0.5% NaGH | Port.[5] | Dyn 531[6] | 1.5 gpb | ineffective |
| 15.8 | 0.5% NaGH | Port. | STC[7] | 1.5 gpb | ineffective |
| 15.8 | 0.5% NaGH | Port. | STC | 3 gpb | slow activation, 4 day |
| 15.8 | 0.5% NaGH | Port. | Sodium silicate 120H | 3 gpb | 16 hrs set, suitable activator |
| 15.8 | 0.5% CaGH | Port. | Sodium silicate 100S | 3 ppb | 16 hrs. set, suitable activator |

[1]Sodium glucoheptonate
[2]The suspending agent for all slag slurries was 0.66 ppb xanthan based on the mix water.
[3]Calcium glucoheptonate TABLE 3-continued

| | | ACTIVATION OF STORABLE SLURRIES | | | |
|---|---|---|---|---|---|
| SLURRY | | CEMENT | ACTIVATOR | | COMMENTS |
| DENSITY | RETARDER | TYPE | TYPE | CONC | 21° C. (70° F.) |

[4]The suspending agent for all slagment slurries was 0.2 gpb succinoglycan based on the mix water.
[5]The suspending agent for all portland cement slurries was 3 ppb bentonite clay based on the mix water.
[6]"DYNAGUNIT 531", Sika GmBh, Germany
[7]Sodium thiocyanate

TABLE 4

| | | | RHEOLOGY OF STORABLE SLURRIES | | | | |
|---|---|---|---|---|---|---|---|
| NO. | SLURRY DENSITY | RETARDER | SUSPENDING AGENT[1] | CEMENT TYPE | TIME DAYS | RHEOLOGY PV/YP | COMMENTS, 21° C. (70° F.) |
| 1 | 15 | 0.1% NaGH[2] | 0.66 ppb xanthan[3] | Slag | 0 | 150/9 | small change in properties |
| | | | | | 15 | 130/2 | |
| 2 | 15.8 | 0.5% CaG[4] | 3 ppb BC[5] | Portland | 0 | 39/20 | |
| | | | | | 14 | 42/30 | |
| | | | | | 21 | 49/32 | small change in properties |
| 3 | 15.8 | 0.5% CaG | 1.5 ppb PEO[6] | Portland | 0 | 52/8 | very minor changes in properties |
| | | | 1.5 ppb SSMA[7] | | 33 | 54/11 | |

[1]All concentration of suspending agent were based on the quantity of mix water.
[2]Sodium glucoheptonate
[3]Xanthan gum
[4]Calcium gluconate
[5]Bentonite clay
[6]Polyethylene oxide
[7]Sulfonated styrene maleic anhydride

TABLE 5

| | | RHEOLOGY OF ACTIVATED SLURRIES | | | | | |
|---|---|---|---|---|---|---|---|
| SLURRY DENSITY (> DILUTED DENSITY) | SET RETARDER % BWOC | SUSPENDING AGENT[1] | ACTIVATOR Sodium Silicate[2] | CEMENT TYPE | RHEOLOGY PV/YP PRE-ACT | POST-ACT | COMMENTS 21° C. (70° F.) |
| 15 | 0.1% NaGH[3] | .66 ppb xanthan[4] | 1.5 gpb 120H | Slag | 147/8 | 150/5 | little change in properties |
| 15.8 > 15 | 0.5% CaG[5] | 3 ppb BC[6] | 3 gpb 100S | Port. | 50/32 | 24/31 | acceptable after dilution |
| 15.8 > 15 | 0.5% CaG | 1.5 ppb PEO[7] 1.5 ppb SSMA[8] | 2 gpb 100S | Port. | 54/11 | 36/18 | acceptable after dilution |

[1]The concentration of the suspending agent was based on the quantity of mix water.
[2]The concentration of activator was based on the quantity of slurry.
[3]Sodium Glucoheptonate
[4]Xanthan gum
[5]Calcium gluconate
[6]Bentonite clay
[7]Polyethylene oxide
[8]Sulfonated styrene maleic anhydride

TABLE 6

| SLURRY DENSITY | RETARDER % BWOC | Sodium Silicate[2] | CEMENT TYPE | SECOND RETARDER | T °C. (°F.) | T. TIME MIN | COMMENT |
|---|---|---|---|---|---|---|---|
| 15 | 0.1% NaGH[3] | 1.25 gpb 100S | Slag[4] | | 71 (160) | 360 | |
| 15 | 0.1% NaGH | .25 gpb 100S | Slag | | 110 (230) | 240 | |
| 15 | 0.1% NaGH | .75 gpb 120H | Slag | | 110 (230) | 93 | |
| 15 | 0.1% NaGH | 3 gpb 120H | Slag | | 71 (160) | 200 | |
| 15 | 0.1% NaGH | .75 gpb 120H | Slag | | 110 (230) | 110 | |
| 15.8 > 15 | 0.5% CaG[5] | 1 gpb 100S | Port.[6] | | 71 (160) | 1037 | |
| 15.8 > 15 | 0.5% CaG | 1.5 gpb 100S | Port. | | 71 (160) | 876 | |
| 15.8 > 15 | 0.5% CaG | 1.65 gpb 100S | Port. | | 71 (160) | 406 | |
| 15.8 > 15 | 0.5% CaG | 1.8 gpb 100S | Port. | | 71 (160) | 100 | |
| 15.8 > 15 | 0.5% CaG | 2 gpb 100S | Port. | | 71 (160) | 56 | |
| 15.8 > 15 | 0.5% CaG | 2gpb 100S | Port. | 0.1 gpb R12-1[7] | 71 (160) | 110 | |
| 15.8 > 15 | 0.5% CaG | 2 gpb 100S | Port. | 0.2 gpb R12-1 | 71 (160) | 239 | |
| 15.8 > 15 | 0.5% CaG | 2.2 gpb 100S | Port | 0.2 gpob R12-1 | 71 (160) | 125 | |
| 15.8 > 12.5 | 0.5% CaG | 2.2 gpb 100S | Port. | | 71 (160) | 90 | |
| 15.8 > 12.5 | 0.5% CaG | 2.2 gpb 100S | Port. | | 49 (120) | 225 | |
| 15.8 > 15 | 0.5% CaG | 3 gpb 100S | Port. | | 49 (120) | 140 | 4 week slurry |
| 15.8 > 15 | 0.5% CaG | 3 gpb 100S | Port. | | 49 (120) | 113 | |
| 15.8 > 15 | 0.5% CaG | 3 gpb 100S | Port. | | 49 (120) | 101 | 1.4 ppb SSMA[8] |
| 15.8 > 15 | 0.5% CaG | 3 gpb 100S | Port. | | 49 (120) | 116 | 0.35 gpb NSAP[9] |
| 15.8 > 15 | 0.5% CaG | 3 gpb 100S | Port. | | 49 (120) | 190 | 0.35 gpb PA[10] |
| 15.8 > 14.5 | 0.5% CaG | 2.5 gpb 100S | Port.[11] | | 71 (160) | 77 | 1.5 ppb SSMA |
| 15 > 14.5 | 0.5% CaG | 2.5 gpb 100S | Slag-ment[12] | | 71 (160) | 78 | 1.4 ppb SSMA |

[1]Thickening time curves generally showed that 100 Bc were reached quickly after thickening had begun. The activator and additional retarder were mixed into dilution water, except for the runs with a density of 12.5 lbm/gal where sea water was added first. Except where noted, tests were done on freshly prepared mixes.
[2]The concentration of sodium silicate is based on the quantity of slurry.
[3]Sodium glucoheptonate
[4]0.66 ppb (mix water) welan gum suspending agent for all slag slurries
[5]Calcium gluconate
[6]3 ppb (mix water) bentonite clay suspending agent for cement slurries
[7]Sodium lignosulfonate, 40% active, "Boregard"
[8]Sulfonated styrene maleic anhydride
[9]Naphthalene sulfonic acid polymer
[10]Polyacrylate
[11]1.5 ppb (mixwater) PEO was used as a suspending agent and 1.5 ppb SSMA was used as a dispersant.
[12]The suspending agent for the slagment slurry was 0.2 gpb of succinoglycan based on the amount of mixwater.

EXAMPLE 2

The following results were found when testing the compressive strength using the following formulation. An especially preferred storable slurry was formed as described in Example 1 with portland cement, 0.5% CaG, 1.5 ppb polyethylene oxide and 1.5 ppb sulfonated styrene maleic anhydride. The resulting slurry had a density of 15.8 lbm/gal.

The slurry was activated with 2.2 gpb 100S sodium silicate and diluted to a final density of 15 lbm/gal. At a curing temperature of 88° C. (190° F.), the following compressive strengths were measured.

| TEST PERIOD (HRS) | COMPRESSIVE STRENGTH (PSI) |
|---|---|
| 8 | 1900 |
| 24 | 3250 |
| 48 | 3750 |

As the above examples show, the slurries of the invention are stable and can be stored for long periods of time while yielding excellent compressive strengths. Because these stable slurries do not set immediately, they can be made at one site and transferred to another site. For example, the slurries can be formulated at one location, such as on land, with the density of the slurry measured and adjusted if desired. Next, the formulated slurry is transferred to a second location, such as an offshore rig. At the second location the transferred slurry may be immediately activated or stored until needed and subsequently activated. At the time of activation, additional mix water and additives are added, while the slurry's density is adjusted to a desired density. The activated slurry is then pumped into the wellbore for the purpose of supporting the casing and isolating subterranean formations.

An invention has been shown with several advantages. The ability to store a liquid cement slurry eliminates onsite mixing problems, particularly the control of slurry density. Proportioning a liquid slurry with liquids, such as extra water or a weighting agent, is far simpler than proportioning bulk solids with water.

Simpler equipment can be used with the storable slurries of the invention. The slurries can be kept in nonpressurized tanks and loaded and unloaded with conventional fluid pumps. When cementing, the mixing unit need do no more than homogenize the fluid streams of the slurry plus additional mixwater and liquid additives en route to the downhole pumps.

The ability to prepare and control the quality of a storable slurry at the base is obviously advantageous. The slurry is mixed and its initial density measured and adjusted at the base rather than at the wellsite. The slurry need only be homogenized and activated during the cementing operation. The stability of the slurry and longterm fluidity allow the slurry to be prepared, transferred and stored a considerable time before needed for wellsite operations. Thus, the slurry may be prepared at a central facility and stored in liquid form at the facility. From there it is loaded aboard trucks or workboats and transferred to the remote wellsite. At the wellsite, it may be offloaded and stored or used immediately for cementing operations.

The slurry can be transferred with centrifugal pumps between storage tanks, transport tanks and downhole pumps much faster than dry cement can be transferred pneumatically. Similarly, the time to offload cargo to an offshore location would be reduced. For land locations, the slurry could be prepared at the rigsite while drilling is in progress or at a central facility and truck to the wellsite, days before the cementing operation and stored until needed.

The activated slurry can be easily modified to be used for a wide variety of cementing purposes desirable in oil and gas well cementing applications. A few example of these properties include gas control, fluid loss control, turbulent flow rheology and high early strength.

While the invention is shown in only some of its forms, it is not thus limited but is susceptible to various changes and modifications without departing from the spirit and scope of the invention.

What is claimed is:

1. A storable, hydraulically-active, cementitious slurry comprising:

a hydraulically-active cementitious material suitable for cementing within subterranean formations for oil or gas wells;

an effective amount of a set retarder to allow the storage of the slurry with a minimal change of the slurry's set characteristics upon activation and to allow the reversal of retardation after adding an effective amount of an activator to the slurry prior to cementing;

a suspending agent for maintaining the slurry with minimal separation of the cementitious material;

an activating agent;

an effective amount of water to form a pumpable slurry;

wherein an effective amount of activating agent is added which is sufficient to overactivate the slurry and wherein an additional amount of set retarder is added to the slurry to achieve a setting time.

2. The storable, hydraulically-active, cementitious slurry of claim 1, wherein the set retarder additionally disperses the slurry and has little effect on compressive strength of the storable slurry after activation and setting.

3. The storable, hydraulically-active, cementitious slurry of claim 2, wherein the set retarder is selected from the group consisting of:

hydroxycarboxylic acids, glucoheptonates, lignin sulfonates, gluconates, phosphonates, and sugars.

4. The storable, hydraulically-active, cementitious slurry of claim 2, wherein the set retarder is selected from the group consisting of:

sodium glucoheptonate, calcium glucoheptonate, magnesium glucoheptonate, lignin sulfonate, sodium lignosulfonate, calcium sodium lignosulfonate, sodium gluconate, calcium gluconate, calcium sodium gluconate, sodium EDTA phosphonate, sucrose and citric acid.

5. The storable, hydraulically-active, cementitious slurry of claim 2, wherein the set retarder is selected from the group consisting of:

sodium glucoheptonate, sodium gluconate, calcium gluconate, calcium sodium lignosulfonate, sucrose and citric acid.

6. The storable, hydraulically-active, cementitious slurry of claim 2, wherein the set retarder is sodium glucoheptonate present in an amount ranging from 0.1 to about 3% BWOC and the cementitious material is slag.

7. The storable, hydraulically-active, cementitious slurry of claim 5, wherein the set retarder is in an amount ranging from about 0.1% to about 5% BWOC and the cementitious material contains hydraulic cement.

8. The storable, hydraulically-active, cementitious slurry of claim 2, wherein the suspending agent is selected from the group consisting of:

welan gum, xanthan gum, carboxymethyl cellulose, polyanionic cellulose, carboxymethylhydroxyethyl cellulose, guar, starch, polyethylene oxide and succinoglycan.

9. The storable, hydraulically-active, cementitious slurry of claim 2, wherein the suspending agent is bentonite or attapulgite.

10. The storable, hydraulically-active, cementitious slurry of claim 2, wherein the suspending agent is a mixed metal hydroxide.

11. The storable, hydraulically-active, cementitious slurry of claim 2, wherein the suspending agent is a mixture of bentonite and xanthan gum and the cementitious material is slag.

12. The storable, hydraulically-active, cementitious slurry of claim 2, wherein the suspending agent is polyethylene oxide.

13. The storable, hydraulically-active, cementitious slurry of claim 2, wherein the suspending agent is a mixture of bentonite and succinoglycan.

14. The storable, hydraulically-active, cementitious slurry of claim 2, wherein the cementitious material is selected from the group consisting of:

slag, hydraulic cement and mixtures thereof.

15. The storable, hydraulically-active, cementitious slurry of claim 2, wherein the cementitious material contains portland cement.

16. The storable, hydraulically-active, cementitious slurry of claim 14, further comprising a dispersant.

17. The storable, hydraulically-active, cementitious slurry of claim 16, wherein the dispersant is selected from the group consisting of:

melamine sulfonic acid polymer, sodium polyacrylate, naphthalene sulfonic acid polymer, and sulfonated-styrene maleic anhydride polymer.

* * * * *

UNITED STATES PATENT AND TRADEMARK OFFICE
CERTIFICATE OF CORRECTION

PATENT NO.  :  5,547,506

DATED  :  August 20, 1996

INVENTOR(S)  :  Philip Rae et al.

It is certified that error appears in the above-identified patent and that said Letters Patent is hereby corrected as shown below:

In column 4, line 64, before "DRISPAC", add a --(--.
In column 4, line 66, before "SHELLFLO-S", add a --(--.
In column 5, line 1, before "POLYOX PEO", add a --(--.
In column 5, line 3, before "POLYVIS", add a --(--.
In column 5, line 6, after "SHELLFLO-S" delete --.--.
In column 5, line 17, after "SHELLFLO-S" delete --.--.
In column 5, line 27, after the word "depends", change "of" to --on--.
In column 5, line 31, before "SP5", add a --(--.
In column 5, line 32, before "BEVALOID 6770", add a --(--.
In column 5, line 34 before "LOMARD", add a --(--.
In column 5, line 34, there should be a space between R and D in the word "LOMARD".
In column 5, line 37, there should be quotation marks before and after the word "SSMA".
In column 6, line 22, before "Crystal", add a --(--.
In column 6, line 23, delete the second parenthetical after the word "England".
In column 6, line 46, before "R12-1", add a --(--.

UNITED STATES PATENT AND TRADEMARK OFFICE
CERTIFICATE OF CORRECTION

PATENT NO.    :    5,547,506

DATED         :    August 20, 1996

INVENTOR(S)   :    Philip Rae et al.

It is certified that error appears in the above-identified patent and that said Letters Patent is hereby corrected as shown below:

In column 6, line 53, delete the word "supensions" and add the word --suspensions--.
In column 9, line 47, delete the word "Attpulgite" and add the word --Attapulgite--.
In column 11, line 46, delete the word "Soidum" and add the word --Sodium--.
In column 12, line 13, delete "0.4" add --0.5--.
In column 19, line 37, delete "example" and add the word --examples--.

Signed and Sealed this

Twenty-sixth Day of January, 1999

Attest:

*Attesting Officer*

*Acting Commissioner of Patents and Trademarks*